United States Patent Office 3,350,410
Patented Oct. 31, 1967

3,350,410
METHOD OF PREPARING TETRA-CHLOROTHIOPHENE
Roland Henry Goshorn, Fort Washington, and Thomas Edward Deger, Ambler, Pa., assignors to Pennsalt Chemicals Corporation, Philadelphia, Pa., a corporation of Pennsylvania
No Drawing. Filed July 7, 1965, Ser. No. 470,243
11 Claims. (Cl. 260—332.5)

ABSTRACT OF THE DISCLOSURE

Tetrachlorothiophene is prepared by reacting sulfur, e.g., at from about 150° C. to about 350° C., with trichloroethylene or tetrachloroethylene.

---

This invention relates to the preparation of tetrachlorothiophene. More particularly this invention concerns a process for preparing tetrachlorothiophene which comprises reacting sulfur with trichloroethylene or tetrachloroethylene or mixtures thereof, i.e., chloroethylenes of the formula

where R is hydrogen or chlorine.

Tetrachlorothiophene is a well known compound having pesticidal properties which is used as a fungicide, insecticide, nematocide or germicide. Several methods have been disclosed for its preparation. For example, U.S. Patent 2,492,624 describes a process for preparing tetrachlorothiophene by reacting thiophene with an excess of chlorine at elevated temperatures and recovering the desired compound by fractional distillation. This process is not economically feasible due to the high cost of the thiophene starting material and the expensive separation of the tetrachlorothiophene from the mixed chlorothiophenes in the product by means of fractional distillation. U.S. Patent No. 2,851,464 describes a process for making tetrachlorothiophene which involves contacting hexachlorothiolane at elevated temperatures with activated carbon. The disadvantages of this process are the relatively high cost of the hexachlorothiolane and the well-known difficulties associated with the handling of activated carbon on a commercial scale. Another method for producing tetrachlorothiophene, disclosed in U.S. Patent No. 2,900,394, involves reacting relatively expensive hexachlorobutadiene with sulfur at elevated temperatures for 7 to 50 hours.

The present invention provides a simple, economical process for preparing tetrachlorothiophene using inexpensive, readily available starting materials. In accordance with this invention, sulfur is reacted with trichloroethylene or tetrachloroethylene or mixtures of said chloroethylene compounds at an elevated temperature. Trichloroethylene is the preferred chloroethylene reactant because higher yields of tetrachlorothiophene are obtained therewith. The tetrachlorothiophene product is recovered from the reaction mixture by suitable, well-known separation techniques as hereinafter described. The reaction may be depicted by the following equation wherein trichloroethylene and sulfur are the reactants.

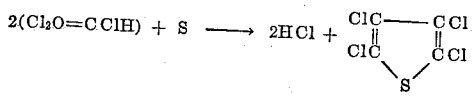

In addition to the HCl, other by-products are formed in the reaction including sulfur monochloride and other forms of sulfur chlorides.

The molar ratio of the reactants employed in the process may be in the range of from about 0.2 mole to about 12 moles of sulfur per mole of the chloroethylene compound. For highest yields of tetrachlorothiophene, a ratio of sulfur to chloroethylene of from about 0.5:1 to 5:1 is preferred.

The reaction embodied in this invention is carried out at elevated temperatures, generally within the range of about 150 to about 350° C. For the most favorable balance of good reaction rate and reasonable yield of tetrachlorothiophene with a limited formation of undesirable by-products and impurities, a temperature range of about 200 to about 300° C. is preferred. The reaction normally is conducted in the absence of solvents or other diluents at pressures ranging from about 1 to about 60 atmospheres, with from about 10 to 40 atmospheres being preferred. In a less preferred embodiment, a high boiling reaction medium which is relatively inert to the reactants may be used as a diluent, such as diphenyl (B.P. 254° C.), naphthalene (B.P. 218° C.), the methyl naphthalenes (B.P. 241–245° C.), acenaphthalene (B.P. 278° C.), and the like. Employing a diluent facilitates operations at the lower pressures but renders product recovery more difficult.

The reaction is conveniently carried out in a closed vessel, for example, an autoclave, equipped with suitable heating means such as electrical heaters or jacketing for hot oil. The vessel should of course be equipped with the necessary vent lines and valves for pressure control and charging and removal of materials. Agitation is not necessary but is desirable to obtain more intimate contact between reactants. The period of reaction is not critical and may extend up to about 90 hours, although the reaction usually is completed in from about 2 to 6 hours. In another embodiment of the process, the chloroethylene can be fed incrementally or in a slow, continuous metered stream onto the surface of molten sulfur where it reacts at a rapid rate. This mode of operation permits a shorter reaction period and easy operation at lower pressures, for example, about 1 to 10 atmospheres, however, the conversion is comparatively low.

Following the completion of the reaction disclosed herein, the tetrachlorothiophene product is recovered from the reaction mixture containing sulfur chlorides, some unreacted sulfur and other impurities, and the lower boiling unreacted chloroethylene by conventional distillation techniques. A preferred procedure is to treat the reaction mixture with water to hydrolyze the sulfur chlorides and then to strip off the residual chloroethylene by steam distilling. The tetrachlorothiophene is separated from the residues by vacuum distillation. It may be further purified by vacuum distillation or sublimation.

The examples which follow are set forth to illustrate the process of this invention and should not be regarded as limitative of the scope of the invention which is defined by the appended claims.

Examples 1–4

In each of a series of four experiments herein described, measured amounts of trichloroethylene and sulfur are charged to a stainless steel autoclave equipped with gas-fired burners for heating. The reactants are heated to the desired reaction temperature, and the desired pressure in the autoclave is maintained by venting the HCl by-product gas produced therein through a valve in the top of the autoclave leading to a scrubber containing an aqueous solution of sodium hydroxide. After a suitable reaction period, evidenced by a cessation of HCl evolution, the reaction mass is cooled, removed from the autoclave, and then subjected to a simple distillation using a column packed with glass helices. The distillate product is analyzed by infrared spectroscopy techniques. The data and results of Examples 1-4 are summarized in the following Table A.

TABLE A

| Ex. No. | Charge | | Reaction conditions | | | Recovery | |
|---|---|---|---|---|---|---|---|
| | Trichloro- ethylene, moles | Sulfur, moles | Temp., °C. | Pressure, p.s.i.g. | Time, hours | Tetrachloro- thiophene, moles | Percent yield, based on trichloro- ethylene¹ |
| 1 | 3.0 | 2.0 | 220-229 | 500 | 2.75 | 0.267 | 13.4 |
| 2 | 5.25 | 2.0 | 170-246 | 500 | 3.0 | 0.368 | 18.5 |
| 3 | 6.94 | 2.0 | 195-244 | 500 | 2.0 | 0.385 | 19.2 |
| 4 | 1.1 | 1.5 | 182-232 | 750 | 1.25 | (²) | |

¹ That theoretically could react with all the sulfur charged.
² Tetrachlorothiophene identified in product but yield not measured.

Example 5

1.0 mole of sulfur and 0.2 mole of trichloroethylene are charged into a stainless steel autoclave which is sealed under vacuum and heated at 250° C. for 72 hours. The autoclave is cooled and the oily reaction mass is treated four times with separate portions of diethyl ether in an amount approximately the size of the reaction mass to extract the tetrachlorothiophene therefrom. The ether is removed from the extract by distillation and the remaining brown residue is treated with hot water to remove sulfur chlorides. The residue is steam distilled to strip off residual trichloroethylene. After the water is removed by decantation, 0.02 mole of tetrachlorothiophene is recovered from the residue by vacuum distillation and purified by vacuum sublimation, equivalent to a yield of 10%.

Examples 6-9

In each of a series of four experiments herein described, measured amounts of tetrachloroethylene and sulfur are sealed in vacuo into a stainless steel autoclave and reacted at elevated temperatures as described hereinbelow for 90 hours. The maximum pressure during reaction is about 270 p.s.i.g. The autoclave is cooled and the reaction products, a brown liquid containing small amounts of slushy solid, is treated with hot water to remove sulfur halides. Residual tetrachloroethylene is taken off by steam distillation and the water is separated from the residue by decantation. Tetrachlorothiophene and traces of hexachloroethane are recovered from the residue by vacuum distillation and the tetrachlorothiophene is purified by sublimation. The data and results are summarized in Table B.

TABLE B

| Ex. No. | Charge | | Reaction tem- perature, °C. | Yield of tetrachloro- thiophene based on tetrachloroethylene percent |
|---|---|---|---|---|
| | Tetrachloro- ethylene, moles | Sulfur, moles | | |
| 6 | 0.3 | 1.2 | 250 | 15 |
| 7 | 0.3 | 1.2 | 230 | 10 |
| 8 | 0.3 | 1.2 | 300 | 13 |
| 9 | 0.3 | 3.0 | 250 | 10 |

Example 10

Trichloroethylene is fed drop-wise onto the surface of molten sulfur in a flask at a temperature of about 250-260° C. The reaction is at atmospheric pressure. Approximately 1% of the trichloroethylene is converted to tetrachlorothiophene. The major portion of the trichloroethylene flashes off, is condensed and recovered for recycle.

Example 11

A flask equipped with a reflux condenser and stirrer is charged with one gram-mole of trichloroethylene, 1.5 gram-moles of sulfur and, as a reaction diluent, 132 grams of diphenyl. The mixture is stirred for 16 hours at 200-220° C. Tetrachlorothiophene, in an amount equal to 5% of the theoretical yield based on the trichloroethylene charged, is isolated from the reaction mixture.

We claim:
1. A method of preparing tetrachlorothiophene which comprises reacting sulfur with a chloroethylene of the formula

where R is hydrogen or chlorine.
2. The method of claim 1 wherein the chloroethylene is trichloroethylene.
3. A method of preparing tetrachlorothiophene which comprises contacting sulfur with a chloroethylene of the formula

where R is hydrogen or chlorine, at a temperature within the range of about 150 to about 350° C. and at a pressure within the range of about 1 to about 60 atmospheres, the molar ratio of sulfur to the chloroethylene being within the range of about 0.2:1 to about 12:1.
4. The method of claim 3 wherein the chloroethylene is trichloroethylene.
5. The method of claim 3 wherein the chloroethylene is tetrachloroethylene.
6. The method of claim 3 wherein the sulfur and chloroethylene are contacted in the presence of a high boiling reaction diluent.
7. A method of preparing tetrachlorothiophene which comprises contacting sulfur with a chloroethylene of the formula

where R is hydrogen or chlorine, at a temperature within the range of about 200 to about 300° C. and at a pressure within the range of about 10 to 40 atmospheres, the molar ratio of sulfur to the chloroethylene being within the range of about 0.5:1 to about 5:1.
8. The method of claim 7 wherein the chloroethylene is trichloroethylene.
9. The method of claim 7 wherein the chloroethylene is tetrachloroethylene.

10. The method of preparing tetrachlorothiophene which comprises feeding a chloroethylene of the formula

where R is hydrogen or chlorine, onto the surface of molten sulfur.

11. The method of claim 10 wherein the chloroethylene is trichloroethylene.

References Cited
UNITED STATES PATENTS

| | | | |
|---|---|---|---|
| 2,410,401 | 10/1946 | Coffman | 260—329 |
| 3,043,887 | 7/1962 | Becke | 260—650 |
| 3,149,124 | 9/1964 | Krespan | 260—332.2 |
| 3,278,552 | 10/1966 | Geering | 260—330.5 |

WALTER A. MODANCE, *Primary Examiner.*

C. M. SHURKO, *Assistant Examiner.*